United States Patent [19]

Mowdood et al.

[11] 3,998,997

[45] Dec. 21, 1976

[54] PRESSURE SENSITIVE ADHESIVES USING INTERPOLYMER OF ACRYLATES, OXYPROPYL ACRYLAMIDES AND ACRYLIC ACID

[75] Inventors: Syed K. Mowdood, Akron; David A. Given, Cuyahoga Falls, both of Ohio

[73] Assignee: The Goodyear Tire & Rubber Company, Akron, Ohio

[22] Filed: Feb. 26, 1975

[21] Appl. No.: 553,358

[52] U.S. Cl. .................... 526/271; 260/47 UA; 260/63 R; 260/63 N; 260/63 UY; 260/66; 526/273; 526/304; 526/317
[51] Int. Cl.² ............... C08F 18/04; C08F 218/04; C08F 220/06; C08F 222/06
[58] Field of Search ............ 260/66, 63 UY, 63 N, 260/63 R, 78.5 R, 80.81, 78.4 R, 47 UA; 326/271, 273, 304, 317, 328

[56] References Cited

UNITED STATES PATENTS

| | | | |
|---|---|---|---|
| 3,535,293 | 10/1970 | Anderson | 260/80.73 |
| 3,558,574 | 1/1971 | Doehnert | 260/78.5 R |
| 3,681,289 | 8/1972 | Kruse et al. | 260/63 UY |
| 3,725,122 | 4/1973 | Reinhard et al. | 260/80.73 |
| 3,738,971 | 6/1973 | Coffman | 260/66 |
| 3,790,533 | 2/1974 | Samour | 260/78.5 R |
| 3,853,822 | 12/1974 | Brod et al. | 260/63 UY |

*Primary Examiner*—Murray Tillman
*Assistant Examiner*—Thurman K. Page
*Attorney, Agent, or Firm*—F. W. Brunner; H. C. Young, Jr.

[57] ABSTRACT

This invention relates to novel one-component, multi-monomer, pressure sensitive adhesives which exhibit good cohesion and adhesion. Tackiness and shear can be varied by a choice of monomers.

9 Claims, No Drawings

PRESSURE SENSITIVE ADHESIVES USING INTERPOLYMER OF ACRYLATES, OXYPROPYL ACRYLAMIDES AND ACRYLIC ACID

This invention relates to pressure sensitive adhesives. More particularly this invention relates to novel one-component, multi-monomer, pressure sensitive adhesives. These adhesives have excellent peel strength and shear, and a tack that can be adjusted by varying the proportions of the monomers used.

Pressure sensitive adhesives are currently utilized in tapes, films, wall coverings, tiles, car body moldings and many other applications requiring ease of application and good adhesion. Many adhesives known to the art require that the adhesive composition be compounded from various materials to obtain the desired properties. These adhesives are known as multi-component adhesives. These materials include those made by compounding base polymers with various additives such as tackifiers, plasticizers and filler. The compounder obtains the desired adhesive characteristics by varying the type and amount of additives. These adhesives usually require that a heat activated curative be separately added.

More preferable for most purposes than the complex multi-component adhesives are the single component adhesives, some of which are self-crosslinking. These single component adhesives have advantages over the compounded adhesives. Low molecular weight, non-bonded additive ingredients normally found in multi-component adhesives often migrate to the surface, destroying the adhesion. Such phenomena are absent in one-component systems. While variation is difficult to avoid in multi-component systems, uniformity is more easily achieved in single component adhesives. Adhesive aging is more easily predicted in single component systems. One component adhesives in addition require no separately added, activated curatives to be useful.

A pressure sensitive, one-component adhesive should exhibit cohesion, tackiness and adhesion. Most one-component adhesives are not cured to the extent of obliterating tackiness. Most polymers are tacky if of sufficiently low molecular weight, but tackiness alone does not constitute a pressure sensitive adhesive. The polymer portion of the adhesive must have sufficient cohesive strength (peel) to allow its removal from surfaces without residue.

It is therefore an object of the present invention to provide a one-component, multi-monomer, pressure sensitive adhesive. Other objects will become apparent to those skilled in this art as the description proceeds.

It has now been discovered that one-component, pressure sensitive adhesives having good peel, shear and tack can be synthesized in solution and emulsion polymerization systems using alkyl acrylates and alkyl methacrylates selected from the group consisting of 2-ethylhexyl acrylate, ethyl acrylate, n-butyl acrylate, tert.butyl acrylate, acrylic acid and diacetone acrylamide as the major constituents and hydroxy propyl acrylate or hydroxy propyl methacrylate, glycidyl acrylate or glycidyl methacrylate, maleic anhydride, and ethylene glycol dimethacrylate as the minor constituents. The monomer compositions of the present invention contain at least four monomers. Monomethyl maleate can be used for some applications to improve tack and aged peel. 2-Hydroxy-4-(3-acryloxy-2-hydroxypropoxy)benzophenone (herein called benzophenone glycidyl acrylate), 2-hydroxy-4-(3-methacryloxy-2-hydroxypropoxy)benzophenone (herein called benzophenone glycidyl methacrylate), diacetophenone acrylamide and tetraallyloxyethane can be used to improve shear strength in the adhesives of this invention.

Adhesives having high peel and good shear and relatively high tack can be made from a system containing from 4 to 6 monomers of which 2-ethylhexyl acrylate, ethyl acrylate, acrylic acid and N-(1,3-dimethyl-1-methyl-3-oxypropyl)acrylamide (herein referred to as diacetone acrylamide) or N-(1,3-diphenyl-1-methyl-3-oxopropyl)acrylamide (herein referred to as diacetopheone acrylamide) are common to all. In order to improve peel, maleic anhydride and hydroxypropyl acrylate or hydroxypropyl methacrylate are added. Alternatively glycidyl acrylate or glycidyl methacrylate can be used as additives to improve peel. Hydroxypropyl acrylate or hydroxypropyl methacrylate with ethylene glycol dimethacrylate or tetraallyloxy ethane or polyethylene glycol dimethacrylate can be added to improve the aged peel.

The polymers and the proportions in which they can be used are given below.

| Polymers | Parts | | |
|---|---|---|---|
| 1. 2-ethylhexyl acrylate | 50 | to | 60 |
| 2. ethyl acrylate | 35 | to | 45 |
| 3. acrylic acid | 1 | to | 3 |
| 4. diacetone acrylamide or diacetophenone acrylamide | 2 | to | 5 |
| 5. hydroxypropyl acrylate or hydroxypropyl methacrylate | 0 | to | 1.0 |
| 6. maleic anhydride | 0 | to | 6.0 |
| 7. glycidyl acrylate or glycidyl methacrylate | 0 | to | 1.0 |
| 8. ethylene glycol dimethacrylate or tetraallyloxy ethane or polyethylene glycol dimethacrylate (having molecular weight from 200 to 600) | 0.02 | to | 0.06 |

Adhesives having low tack, high peel and relatively high shear values can be obtained by using from 4 to 7 monomers of which ethyl acrylate from 70 to 85 parts, glycidyl acrylate or glycidyl methacrylate from 0.5 to one part, monomethyl maleate from 5 to 10 parts and diacetophenone acrylamide or diacetone acrylamide from 3.5 to 9.5 parts are common to all. The properties may be varied by adding other monomers such as maleic anhydride from 0.5 to 5.5 parts, acrylic acid from 0.5 to 2.0 parts, tetraallyloxy ethane from 0.05 to 0.2 part and PMA from 0.1 to 1.0 part. The functions of these components are the same as for the high tack adhesives previously described.

The monomer composition comprising a total of 100 parts by weight is reacted in the presence of a difunctional vinyl, trifunctional vinyl or tetrafunctional vinyl crosslinking agent. The functions comprise polymerizable carbon to carbon double bonds (vinyl bonds) and epoxy functions or a combination of vinyl and a function selected from the group consisting of hydroxy, ester ether, amide and nitrile. Representative examples of crosslinking agents useful in the present invention and levels at which they are useful are:

| | | |
|---|---|---|
| tetraallyloxyethane | 0–.2 | part |
| triallyl cyanurate | 0–.2 | part |
| triallylisocyanurate | 0–.2 | part |
| zinc oxide | 0–.3 | part |
| polyethylene glycol dimethacrylate | 0–.3 | part |

-continued

| | | |
|---|---|---|
| tetraethylene glycol diacrylate | 0–.3 | part |
| 1,6-hexane diol diacrylate | 0–.3 | part |
| diethylene glycol diacrylate | 0–.3 | part |
| trimethylol propane triacrylate | 0–.3 | part |
| triethylene glycol diacrylate | 0–.3 | part |
| triethylene glycol dimethacrylate | 0–.3 | part |
| pentaerythritol tetra acrylate | 0–.3 | part |
| pentaerythritol tetra methacrylate | 0–.3 | part |
| dimethylamino ethyl diacrylate | 0–.3 | part |
| dimethylamino ethyl dimethacrylate | 0–.3 | part |
| 1,3-butylene glycol dimethacrylate | 0–.3 | part |

Whenever in the specification and claims a compound is an acrylate, the methacrylate of the same compound is also understood to be effective in the same proportion as the acrylate.

The one component, multi monomer, pressure sensitive adhesives of the present invention are generally prepared in solution systems by dissolving the monomer constituents in an organic solvent, adding cross-linking agents and reacting under heat and pressure to produce the adhesive. Preferably the reaction vessel is purged with an inert gas such as nitrogen prior to the reaction.

Representative examples of organic solvents useful in the process of the present invention are:
ethyl acetate
n-hexane
methyl ethyl ketone
acetone
toluene
benzene
chloro benzene
isopropanol
ethanol
xylene
dioctyl adipate
dibutyl sebacate
diethyl phthalate Reaction temperatures can vary widely. Generally the reaction reaches temnperatures of 0° to 120° C. Preferred temperatures are from about 50° to 100° C. Reaction times can also vary widely. Generally from about 2 to 15 hours is sufficient. Preferred reaction times are from about 4 to about 10 hours.

Solution polymerizations of these pressure sensitive adhesives can be used but require the use of a free radical generating catalyst. Representative examples of such catalysts are:
lauroyl peroxide
benzoyl peroxide
dicumyl peroxide
cumene hydroperoxide
t-butyl-peroxy-isopropyl carbonate
t-butyl-peroxy-pivalate
t-butyl-peroxy benzoate
t-butyl-peroxy carbonate Azo compounds such as azobisisobutyronitrile; 2,2-azobis(2,4-dimethyl valeronitrile) and dialkyl or dicycloalkyl peroxydicarbonates having from 4 to 22 carbon atoms, such as diethyl peroxydicarbonate, dicyclohexyl peroxydicarbonate, didodecylperoxydicarbonate and di-(tert.butyl cyclohexyl) peroxydicarbonate can also be used.

The pressure sensitive adhesives of this invention can also be prepared from emulsion polymerization systems. The emulsion systems require water, buffers, emulsifiers and catalysts.

The pressure sensitive adhesives are generally prepared in emulsion systems by adding the emulsifier to water, adding a buffer and finally adding the monomers to be reacted. In one mode of carrying out the polymerization the water can in addition contain the reaction initiator. The catalysts can be added in the water or after the monomers have been added to the water. The reaction is normally polymerized to the degree desired and then shortstopped by methods well known to those skilled in this art such as by addition of phenolic antioxidants. If desired, molecular weight regulators can be added to the reaction vessel at the beginning of the polymerization.

Emulsifiers used in the emulsion polymerization systems are of the anionic, cationic, nonionic or amphoteric type. Representative examples of the anionic emulsifiers useful in the present invention are surfactants such as Abex 18S, Abex 22S, Abex 26S and Abex VA40, all manufactured by Alcolac Inc., tetrasodium N-(1,2-dicarboxyethyl)-N-octadecyl sulfosuccinate, disodium ethoxalated alcohol half ester of sulfosuccinic acid, sold as Aerosol 102 by American Cyanamid Company, disodium ethylated nonyl phenol half ester of sulfosuccinic acid sold as Aerosol 103 by American Cyanamid Company, dodecyl benzene sodium sulfonate, sulfonated castor oil, alkylaryl sodium sulfonate and sodium salts of alkylaryl polyether sulfate. Representative examples of cationic emulsifiers are quaternary ammonium chloride, tertiary amines, ethylene oxide condensation products of primary fatty amines such as Ethomeen T12, T15, O12, and O15 sold by Armak Company, cetyl dimethyl benzyl ammonium chloride, and cationic emulsifying waxes such as Cycloton CT100 sold by Cyclo Chemicals Corp.

Representative examples of amphoteric emulsifiers are dicarboxylic coconut derivatives of sodium salts such as Miranol C2M-SF, sold by Miranol Chemical Company, dicarboxylic caprylic derivatives of sodium salts such as Miranol J2N, sold by Miranol Chemical Company, and sodium salts of amphoteric surfactants such as Triton QS-15 sold by Rohm and Haas Company.

Representative examples of nonionic emulsifiers are nonyl phenoxy poly(ethyleneoxy)-ethanol, nonyl phenyl polyethylene glycol ether, polyalkylene glycol ether and polyoxyethylene sorbitan monolaurate.

The reaction conditions of an emulsion polymerization system can vary widely. Generally a polymerization temperature of from 0° to 120° C. is used. Reaction times can vary from 2 to 15 hours.

Representative examples of shortstopping agents, also useful as stabilizers, are 2,5-ditertiary butyl p-cresol, the reaction product of one mole of phenol and 2 moles of styrene, sold as Wing-Stay S by The Goodyear Tire & Rubber Company, and the butylated reaction product of 3 moles of p-cresol and one mole of dicyclopentadiene, sold as Wing-Stay L by The Goodyear Tire & Rubber Company.

Representative exampls of molecular weight regulators useful in the present invention are dodecyl mercaptan, dodecyl benzyl mercaptan, tertiary dodecyl mercaptan, butyl mercaptan and alkyl thio acetic acid.

Representative examples of buffers are sodium bicarbonate, sodium carbonate, ammonium hydroxide, sodium bisulfite, sodium phosphate and sodium hydrogen phosphate.

Representative examples of catalysts are ammonium persulfate, potassium persulfate, potassium perphosphate, alkyl hydroperoxides having from 3 to 12 carbon atoms, such as t-butyl hydroperoxide, 2-octyl hydroperoxide, diisopropylbenzene hydroperoxide and hydrogen peroxide.

Representative examples of Redox systems are sodium bisulfite, ferrous sulfate and sodium formaldehyde sulfosuccinate in combination with hydrogen peroxide or an alkyl or cycloalkyl hydroperoxide having from 3 to 12 carbon atoms.

The invention is more concretely defined with reference to the examples below wherein all parts and percentages are by weight unless otherwise specified. Examples 1 to 10 illustrate the present invention in solution polymerization systems. Example 11 illustrates the present invention in an emulsion polymerization system.

EXAMPLE 1

A single-component, high tack, pressure sensitive adhesive was prepared using the following recipe.

2-EHA = 2 ethyl hexyl acrylate
n-Ba = n-butyl acrylate
EA = ethyl acrylate
GA = glycidyl acrylate
GMA = glycidyl methacrylate
HPA = hydroxy propyl acrylate
HPMA = hydroxy propyl methacrylate
MA = maleic anhydride
MMM = monomethyl maleate
DAA = diacetone acrylamide
EGDMA = ethylene glycol dimethacrylate
EAC = ethyl acetate
Hex = hexane
DPA = diacetophenone acrylamide
TAE = tetra allyloxyethane
TAC = triallyl cyanurate
PA = Permasorb A = 2-hydroxy-4-(3-acryloxyl-2-hydroxypropoxy)benzophenone
PMA = Permasorb MA = 2-hydroxy-4-(3-methacryloxy-2—hydroxy-propoxy)benzophenone
PEGDMA = polyethylene glycol dimethacrylate Table I

| | | | | Solution Polymerization Recipe of Pressure Sensitive Adhesives (Parts) | | | | | | | | | | |
|---|---|---|---|---|---|---|---|---|---|---|---|---|---|---|
| Ex. | 2EHA | nBA | EA | GA or GMA | HPA or HPMA | MA | AA | DAA or DPA | EGDMA | PA or PMA | TAE or TAC etc | MMM | EAc-Hex | AIBN | Reacn Temp (°F) | Reacn Time (Hrs.) |
| 2 | — | — | 80 | GA 1.0 | — | — | — | DAA 8.0 | — | PA 1.0 | TAE 0.2 | 10.0 | 100 | 0.3 | 140 | 16.0 |
| 3 | — | — | 80 | 0.5 | — | 0.5 | — | 9.5 | — | — | — | 9.5 | 100 | 0.3 | 140 | 16.0 |
| 4 | — | — | 80 | 0.5 | — | 4.0 | 0.5 | 8.0 | — | — | — | 5.0 | 100 | 0.3 | 140 | 16.0 |
| 5 | — | — | 83 | GMA 1.0 | — | — | 5.5 | 0.5 | DAA 5.0 | — | — | — | 5.0 | 100 | 0.3 | 140 | 15.33 |
| 6 | — | — | 85 | 0.5 | — | 4.0 | 1.5 | DPA 4.0 | — | — | — | 5.0 | 120 | 0.3 | 140 | 16.11 |
| 7 | — | — | 85 | 0.5 | — | 4.0 | 1.5 | DAA 4.0 | — | — | — | 5.0 | 120 | 0.3 | 149 | 8.0 |
| 8 | — | 14 | 70 | 0.5 | — | 5.0 | 2.0 | 3.5 | — | — | — | 5.0 | 120 | 0.3 | 149 | 8.0 |
| 9 | — | — | 85 | 0.5 | — | 4.0 | 1.5 | 4.0 | — | — | — | 5.0 | 120 | 0.3 | 149 | 8.33 |
| 10 | — | 10 | 74 | 0.5 | — | 5.0 | 1.5 | 4.0 | — | — | — | 5.0 | 120 | 0.3 | 149 | 8.33 |

| | Parts |
|---|---|
| 2-ethyl hexyl acrylate | 56.1 |
| ethyl acrylate | 38.1 |
| hydroxypropyl methacrylate | 0.76 |
| acrylic acid | 2.0 |
| diacetone acrylamide | 3.0 |
| ethylene glycol dimethacrylate | 0.04 |
| azobisisobutyronitrile | 0.3 |
| ethyl acetate | 100.0 |
| n-hexane | 20.0 |

To prepare the adhesive, diacetone acrylamide was dissolved in hexane/ethyl acetate. The remaining monomers were added to the hexane/ethyl acetate solvent and the solution was placed in a clean reactor. A free radical generator (azobisisobutyronitrile) was added to the solution. The reactor was purged with nitrogen and placed under constant agitation at 140 revolutions per minute. The reactor was heated to 138° F. The reaction was checked for solids content at every hour. The reaction was discharged at 45 percent solids (98–99.5 percent yield) and the contents were cooled and the reaction products obtained. During the course of the reaction the pressure within the reactor reached 25 pounds per square inch gauge.

EXAMPLES 2–10

Examples 2–10 were run in the same fashion as described for Example 1. The recipes of the various low tack pressure sensitive adhesives prepared are given in Table I. All ingredients shown in the tables are represented by the following abbreviations.

The pressure sensitive adhesives prepared as described in Example 1 using the recipes shown in Table I were tested for peel, shear strength and tack using the methods outlined in the Pressure Sensitive Tape Council Manual entitled, "Test Methods for Pressure Sensitive Tapes, 5th Edition."

Peel adhesion (180° Peel) is defined as the force required to remove a pressure sensitive tape from a panel or its own backing at a specified angle and speed. The tape is applied to a standard test panel, or test panel covered with the tape under test, using a determined definite pressure to make contact. The force is expressed in ounces per inch width of tape. The test is more fully described in the Manual of the Pressure Sensitive Tape Council, page 27, test PSTC-1.

The rolling ball tack test was designed to measure tack where the adhesion is insufficient to give a reading on peel adhesion. The test is fully described in the Manual of the Pressure Sensitive Tape Council, page 38, test PSTC-6.

Shear adhesion is defined as the force necessary to remove the tape from a standard flat surface in a direction parallel to the surface to which it has been affixed under a predetermined definite pressure. Results are measured as time required to remove a standard tape area from a test panel using a standard load, or as distance displaced in a given time under a standard load. The test is more fully described in the Manual of the Pressure Sensitive Tape Council, page 40, test PSTC-7.

Aging results on all tests were carried out on duplicate samples which were prepared at the same time. One sample was tested immediately, while a duplicate was aged for one week at 70° C. (158° F.) under atmosphere before testing. The results are shown in Table II.

Table II

Physical Properties of Pressure Sensitive Adhesives

| | Pre-aged | | Aged | |
|---|---|---|---|---|
| Ex. | 180° Peel Strength (lb/in) | Shear (in mins) | 180° Peel Strength (lb/in) | Shear (in mins) |
| 2 | 2.4 | 814 | 2.2 | 2238 |
| 3 | 3.1 | 276 | 2.8 | 4418 |
| 4 | 3.3 | 292 | 2.2 | 7991 |
| 5 | 3.3 | 2313 | 2.0 | Indefinite |
| 6 | 3.2 | 1420 | 2.7 | Indefinite |
| 7 | 3.8 | Indefinite | 2.8 | Indefinite |
| 8 | 3.9 | Indefinite | 3.1 | Indefinite |
| 9 | 3.7 | Indefinite | 2.8 | Indefinite |
| 10 | 4.0 | Indefinite | 2.9 | Indefinite |

Emulsion polymerization was carried out using the procedure shown in Example 11.

EXAMPLE 11

A pressure sensitive adhesive was prepared using the following recipe and procedure.

| | Parts |
|---|---|
| 2-ethyl hexyl acrylate | 56.1 |
| ethyl acrylate | 38.1 |
| diacetone acrylamide | 3.0 |
| hydroxypropyl methacrylate | 0.76 |
| ethylene glycol dimethacrylate | 0.04 |
| acrylic acid | 2.0 |
| disodium ethoxylated alcohol half ester of sulfosuccinic acid | 12.0 |
| ammonium persulfate | 0.2 |
| distilled water | 170.0 |

Monomers were added to a bottle containing an aqueous solution of 30 percent disodium ethoxylated alcohol half ester of sulfosuccinic acid. Ammonium persulfate solution was added to the mixture. The bottle was purged with nitrogen and reacted at 65° C. for six hours in a constant temperature water bath. The contents of the reaction vessel were placed under a constant agitation of about 140 revolutions per minute. The reaction was halted when 32 percent solids was reached. The adhesive thus formed had a 180° peel value of 1.4 pounds per inch, a shear of 610 minutes and a rolling ball tack of 1⅛ inches. Aging the sample for seven days at 70° C. before testing gave a 180° peel of 1.5 pounds per inch, a shear of 409 minutes and a rolling ball tack of 1¼ inches.

Pressure sensitive adhesives having high tack as opposed to the low tack adhesive of Table I were prepared in solution systems utilizing the monomer composition described herein. The procedure was the same as described in Example 1. These examples are shown by recipe and reaction time in Table III.

Table III

| Ex. | 2EHA | nBA | EA | GM or GMA | HPA or HPMA | MA | AA | DAA | EGDMA | EAC-Hex (5:1) | (AIBN) | Reacn Temp (° F) | Reacn Time (Hrs) | % Yield | % Solids |
|---|---|---|---|---|---|---|---|---|---|---|---|---|---|---|---|
| 1 | 50 | — | 44 | GMA 0.5 | — | — | 2.0 | 3.5 | — | 120 | 0.3 | 149 | 8.0 | 98.8 | 44.9 |
| 2 | 56.1 | — | 38.1 | — | HPMA 0.76 | — | 2.0 | 3.0 | 0.04 | 120 | 0.3 | 138 | 8.5 | 99.9 | 45.4 |
| 3 | 54 | — | 35 | — | HPMA 1.0 | 5.0 | 2.0 | 3.0 | — | 120 | 0.3 | 140 | 6.4 | 91 | 41.4 |
| 4 | 54 | — | 35 | — | HPA 1.0 | 5.0 | 2.0 | 3.0 | — | 120 | 0.3 | 139 | 9.0 | 95.7 | 43.5 |
| 5 | 56.1 | — | 36 | — | HPA 0.86 | — | 2.0 | 5.0 | 0.04 | 120 | 0.3 | 140 | 4.6 | 95.1 | 43.2 |
| 6 | 56.1 | — | 37 | — | HPA 0.86 | — | 2.0 | 4.0 | 0.04 | 120 | 0.3 | 140 | 4.0 | 95 | 43 |
| 7 | 57.2 | — | 38 | — | HPA .75 | — | 2.0 | 2.0 | PEGDMA 0.05 | 120 | 0.3 | 149 | 6.5 | — | 44 |
| 8 | 57.1 | — | 38.1 | — | HPMA .75 | — | 2.0 | 2.0 | TAE 0.05 | 120 | 0.3 | 149 | 6.5 | — | 44 |

Physical properties of these compounds were tested using the same tests as described in Table II. Test results for the compounds of Table III are given in Table IV.

Table IV

| | Physical Properties | | | | | |
|---|---|---|---|---|---|---|
| | Peel Strength (180°, lb/in) | | Shear Strength (mins) | | Tack (inches) | |
| Ex. | Pre-aged | Aged | Pre-aged | Aged | Pre-aged | Aged |
| 1 | 3.4 | 2.5 | 8.0 | Indef. | 1 | 2 |
| 2 | 3.1 | 2.8 | 15 | Indef. | 0.62 | 1.12 |
| 3 | 4.6 | 2.5 | 12 | Indef. | 2.5 | 7.12 |
| 4 | 3.6 | 2.3 | 13 | 8317 | 1.87 | 3.12 |
| 5 | 2.5 | 2.2 | 48 | 131 | 0.87 | 7 |
| 6 | 3.4 | 2.3 | 30 | 76 | 1 | 3 |
| 7 | 3.2 | 2.6 | 5 | 64 | 0.75 | 1 |
| 8 | 3.0 | 2.7 | 6 | 539 | 0.63 | 1.12 |

Either solution or emulsion polymerization reactions can be shortstopped using phenolic antioxidants as exemplified in Examples 12 and 13. Such antioxidants are normally used in concentrations of from 0.02 to 10 parts, but from 0.05 to 2 parts is preferred.

EXAMPLE 12

Example 12

| | Parts |
|---|---|
| 2-ethyl hexyl acrylate | 56.0 |
| ethyl acrylate | 33.0 |
| diacetone acrylamide | 3.0 |
| maleic anhydride | 5.0 |
| acrylic anhydride | 2.0 |
| hydroxy propyl acrylate | 1.0 |
| Wing-Stay S* | .2 |
| azobisisobutylnitrile | .3 |
| ethyl acetate | 100.0 |
| n-hexane | 20.0 |
| & Total Solids | 38.4 % |

*-1:2 reaction product of phenol and styrene sold by The Goodyear Tire & Rubber Company.

The reaction was carried out as described in Example 1. The adhesive was then tested as previously described.

|  | Original | Aged |
|---|---|---|
| 180° peel (pound/inch) | 4.05 | 2.2 |
| shear (minutes) | 9 | 425 |
| rolling ball tack (inches) | 5.75 | 7.5 |

EXAMPLE 13

Example 13

|  | Parts |
|---|---|
| 2-ethyl hexyl acrylate | 56.1 |
| ethyl acrylate | 38.1 |
| diacetone acrylamide | 3.0 |
| acrylic acid | 2.0 |
| hydroxy propyl methacrylate | .76 |
| ethylene glycol dimethacrylate | .04 |
| 2,6-di-t-butyl-4-hydroxyethane-p-phenol | .2 |
| azobisisobutylnitrile | .3 |
| ethyl acetate | 100.0 |
| n-hexane | 20.0 |
| & Total Solids | 42.3 % |

The reaction was carried out as described in Example 1. The adhesives were then tested as previously described.

|  | Original | Aged |
|---|---|---|
| 180° peel (pounds/inch) | 2.85 | 2.5 |
| shear (minutes) | 9 | 232 |
| rolling ball tack (inches) | .62 | .62 |

The pressure sensitive adhesives of the present invention have essentially the same properties when prepared by solution, suspension or emulsion polymerization techniques as shown in the data given in Table II and Example 11.

While certain representative embodiments and details have been shown for the purpose of illustrating the invention, it will be apparent to those skilled in this art that various changes and modifications may be made therein without departing from the spirit or scope of the invention.

We claim:

1. A one-component pressure sensitive adhesive having high peel, shear and tack comprised essentially of a total of 100 parts by weight of; 2-ethyl hexyl acrylate, 50 to 60 parts; ethyl acrylate, 35 to 45 parts; acrylic acid, 1 to 3 parts; and diacetone acrylamide or diacetophenone acrylamide, 2 to 5 parts.

2. An adhesive as described in claim 1 wherein from 0.5 to 2.0 parts of acrylic acid is added.

3. An adhesive as described in claim 1 wherein up to one part of a monomer selected from the group consisting of glycidyl acrylate and glycidyl methacrylate is added.

4. An adhesive as described in claim 1 wherein from 0.02 to 0.06 part of a material selected from the group consisting of ethylene glycol dimethacrylate and ethylene glycol methacrylate is added with up to one part of hydroxy propyl acrylate or hydroxy propyl methacrylate.

5. An adhesive as described in claim 4 wherein tetraalloxyethane is used in palce of ethylene glycol dimethacrylate.

6. An adhesive as described in claim 4 wherein polyethylene glycol dimethacrylate is used in place of ethylene glycol dimethacrylate.

7. A one-component pressure sensitive adhesive which is comprised essentially of a total of 100 parts by weight of; 2-ethylhexyl acrylate, 50 to 60 parts; ethyl acrylate, 30 to 45 parts; acrylic acid, 1 to 3 parts; and acrylamide selected from diacetone acrylamide and diacetophenone acrylamide, 2 to 5 parts; maleic anhydride, up to 6 parts; and up to 1 part of acrylate and/or methacrylate selected from hydroxy propyl acrylate, hydroxy propyl methacrylate, hydroxy methyl acrylate, hydroxy methyl methacrylate and hydroxy ethyl acrylate.

8. The one-component pressure sensitive adhesive of claim 7 where said up to 1 part of said acrylate and/or methacrylate is selected from at least one of hydroxy propyl acrylate and hydroxy propyl methacrylate.

9. The one-component pressure sensitive adhesive of claim 7 where said up to 1 part of acrylate and/or methacrylate is selected from at least one of hydroxy methyl acrylate, hydroxy methyl methacrylate and hydroxy ethyl acrylate.

* * * * *